US011470055B2

(12) United States Patent
Tyson et al.

(10) Patent No.: US 11,470,055 B2
(45) Date of Patent: Oct. 11, 2022

(54) DATA TRANSMISSION WITH ENCRYPTION OF PROTECTED DATA

(71) Applicant: Bank of America Corporation, Charlotte, NC (US)

(72) Inventors: David Tyson, Charlotte, NC (US); Jatinkumar Pramodbhai Patel, Plano, TX (US); Carl. M. Benda, Charlotte, NC (US); Lakshmi L. Karuppiah, West Hills, CA (US)

(73) Assignee: Bank of America Corporation, Charlotte, NC (US)

( * ) Notice: Subject to any disclaimer, the term of this patent is extended or adjusted under 35 U.S.C. 154(b) by 57 days.

(21) Appl. No.: 16/912,910

(22) Filed: Jun. 26, 2020

(65) Prior Publication Data

US 2021/0409381 A1 Dec. 30, 2021

(51) Int. Cl.
*H04L 29/06* (2006.01)
*H04L 9/40* (2022.01)
*H04L 9/06* (2006.01)
*H04L 9/08* (2006.01)

(52) U.S. Cl.
CPC ........ *H04L 63/0428* (2013.01); *H04L 9/0643* (2013.01); *H04L 9/0861* (2013.01)

(58) Field of Classification Search
CPC .... H04L 63/0428; H04L 9/0643; H04L 9/086
USPC ........................................................ 713/164
See application file for complete search history.

(56) References Cited

U.S. PATENT DOCUMENTS

| | | | |
|---|---|---|---|
| 6,862,602 B2 | 3/2005 | Guha | |
| 7,072,909 B2 | 7/2006 | Polk | |
| 8,256,007 B2* | 8/2012 | Dossett | ................ H04L 9/0822 |
| | | | 726/26 |
| 8,515,965 B2 | 8/2013 | Mital et al. | |
| 8,634,555 B2* | 1/2014 | Kuno | ............... G11B 20/00478 |
| | | | 380/210 |
| 8,707,058 B1 | 4/2014 | Bain | |
| 8,838,558 B2 | 9/2014 | Luk | |
| 8,848,519 B2 | 9/2014 | Kini et al. | |
| 9,104,883 B2 | 8/2015 | McKenna | |
| 9,202,078 B2 | 12/2015 | Abuelsaad et al. | |
| 9,396,355 B2* | 7/2016 | Bhagwan | ............ G06F 21/6254 |
| 9,582,680 B2 | 2/2017 | Bilodeau et al. | |
| 10,095,882 B2* | 10/2018 | Waisbard | ............... H04L 63/068 |
| 10,853,515 B2* | 12/2020 | Whitcomb | .......... G06F 21/6245 |

(Continued)

OTHER PUBLICATIONS

Multiprotocol Labael Switching Wikipedia 7 pages.

*Primary Examiner* — Amare F Tabor
(74) *Attorney, Agent, or Firm* — Banner & Witcoff, Ltd.

(57) ABSTRACT

Aspects of the disclosure relate to data transmission with encryption of protected data. A computing platform may separate, via a computing device and in electronic data associated with a user, protected data from non-protected attribute data. Subsequently, the computing platform may generate, for the protected data, an encryption key. Then, the computing platform may modify the electronic data by replacing the protected data with the encryption key. Then, the computing platform may store, in a database, an association between the user, the protected data, and the encryption key. Subsequently, the computing platform may provide, via a network and to an external vendor, the modified electronic data comprising the encryption key and the non-protected attribute data.

14 Claims, 8 Drawing Sheets

(56) References Cited

U.S. PATENT DOCUMENTS

| | | | |
|---|---|---|---|
| 10,873,450 B2* | 12/2020 | Keselman | G06F 16/278 |
| 2013/0339739 A1* | 12/2013 | Hueber | G06F 21/85 |
| | | | 713/171 |
| 2016/0342811 A1 | 11/2016 | Whitcomb et al. | |
| 2020/0387614 A1* | 12/2020 | Harrison | G06F 21/64 |

* cited by examiner

DATA TRANSMISSION WITH ENCRYPTION OF PROTECTED DATA

BACKGROUND

Aspects of the disclosure relate to deploying digital data processing systems for secure transmission of protected data. In particular, one or more aspects of the disclosure relate to data transmission with encryption of protected data.

In the performance of its various functions, an enterprise organization may need to process, store, transmit, and/or modify data related to personal information. Generally, some of the information may be protected data, whereas some other information may be non-protected data. In some instances, such information may be vulnerable to a data breach that may compromise security of the protected data. Ensuring security of the data transmission may be highly advantageous to providing reliable enterprise functions. In many instances, however, it may be difficult to provide data security with speed and accuracy, while also attempting to optimize network resources, bandwidth utilization, and efficient operations of the associated computing infrastructure.

SUMMARY

Aspects of the disclosure provide effective, efficient, scalable, fast, reliable, and convenient technical solutions that address and overcome the technical problems associated with data transmission with encryption of protected data.

In accordance with one or more embodiments, a computing platform having at least one processor, and memory storing computer-readable instructions that, when executed by the at least one processor, cause the computing platform to separate, via a computing device and in electronic data associated with a user, protected data from non-protected attribute data. Subsequently, the computing platform may generate, for the protected data, an encryption key. Then, the computing platform may modify the electronic data by replacing the protected data with the encryption key. Then, the computing platform may store, in a database, an association between the user, the protected data, and the encryption key. Subsequently, the computing platform may provide, via a network and to an external vendor, the modified electronic data comprising the encryption key and the non-protected attribute data.

In some embodiments, the electronic data associated with the user may be in a data file, and the protected data may be an entry in a data field in the data file.

In some embodiments, generating the encryption key may be based on a unidirectional hashing algorithm.

In some embodiments, the computing platform may, upon a determination that a second user is authorized to access the protected data, retrieve, from the database, the association between the user, the protected data, and the encryption key. Then, the computing platform may replace, based on the retrieved association and in the modified electronic data, the encryption key with the plaintext of the protected data. Subsequently, the computing platform may provide the plaintext of the protected data to the second user.

In some embodiments, the computing platform may retrieve, via the network, the electronic data from a network attached storage device.

In some embodiments, the computing platform may receive, from the external vendor, a second encryption key associated with a second protected data. Then, the computing platform may compare the second encryption key with the encryption key. Subsequently, the computing platform may, upon a determination that the second encryption key is identical to the encryption key, determine that the second protected data is identical to the protected data.

In some embodiments, the computing platform may receive, from the external vendor, a first encryption key and a second encryption key. Then, the computing platform may determine, based on a comparison of the first encryption key and the encryption key, that the first encryption key is identical to the encryption key. Subsequently, the computing platform may associate, based on the determination that the first encryption key is identical to the encryption key, the user with the second protected data associated with the second encryption key.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Enterprise users (e.g., employees of an enterprise organization, such as a financial institution) generally have access to confidential and sensitive protected data associated with the enterprise organization and/or customers of the enterprise organization. An enterprise organization has a duty and a responsibility to protect such protected data. In many instances, confidential and secure protected data may be vulnerable to unauthorized access and/or misappropriation. Accordingly, it may be of high significance for an enterprise organization to devise ways in which to protect the integrity of protected data. Fast and reliable responses to potential request for protected data, while maintaining data integrity in transmission and storage, may be of high significance to ensuring enterprise security.

Some aspects of the disclosure relate to data transmission with encryption of protected data. For example, protected data may be separated from non-protected data. The protected data may be associated with an encryption key, and the association may be stored in a database. The encryption key may then be substituted for the protected data, merged with the non-protected data, and transmitted to external parties. In addition to protecting user data, such techniques to protect data and its integrity may include advantages for an enterprise business such as, for example, preventing a loss of reputation in a marketplace, minimizing litigation, minimizing loss of business engagements and/or partnerships, and minimizing loss resulting from other tangible and intangible business opportunities.

Figure 1A:
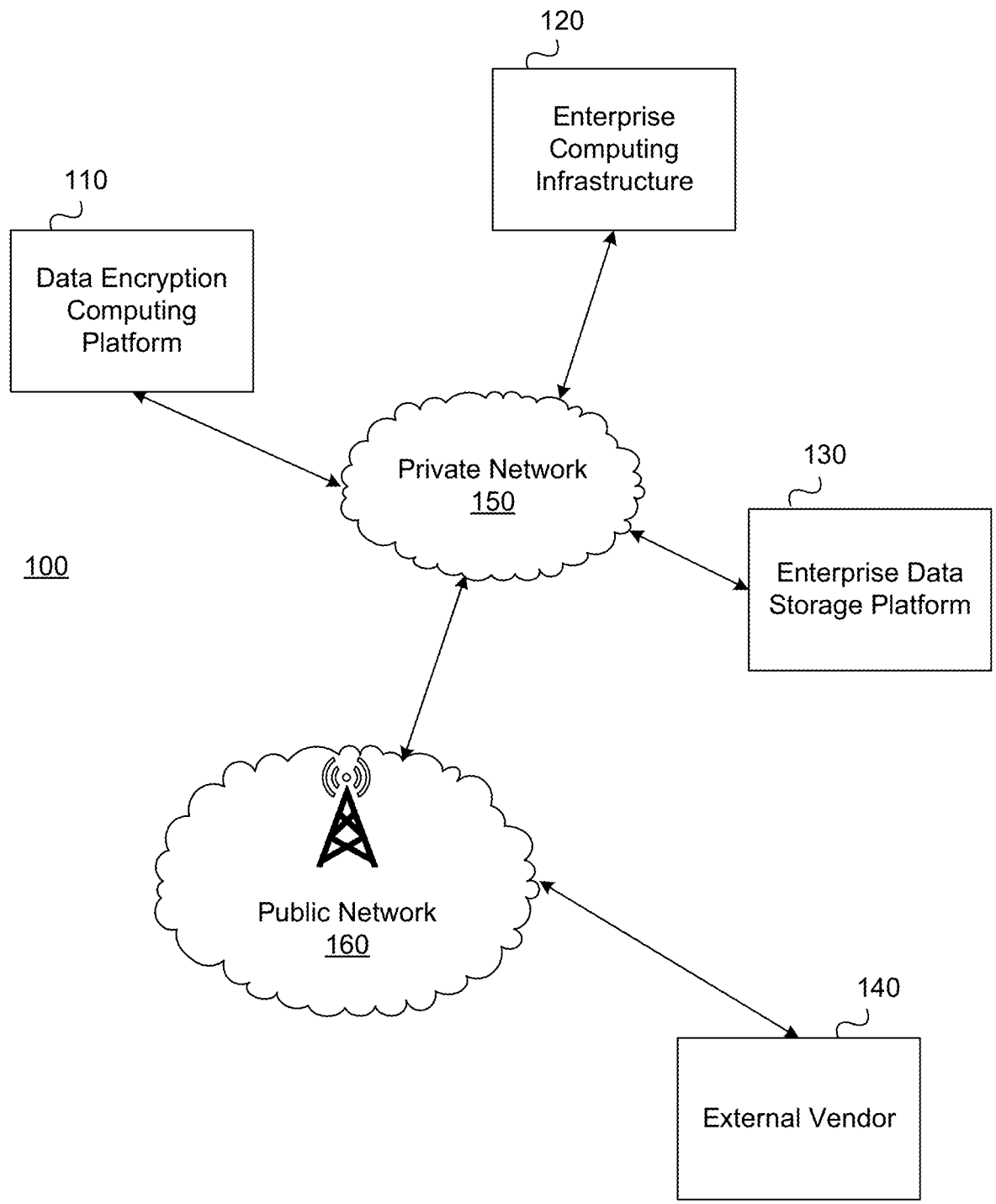
FIGS. 1A and 1B depict an illustrative computing environment for data transmission with encryption of protected data.
Figure 1B:
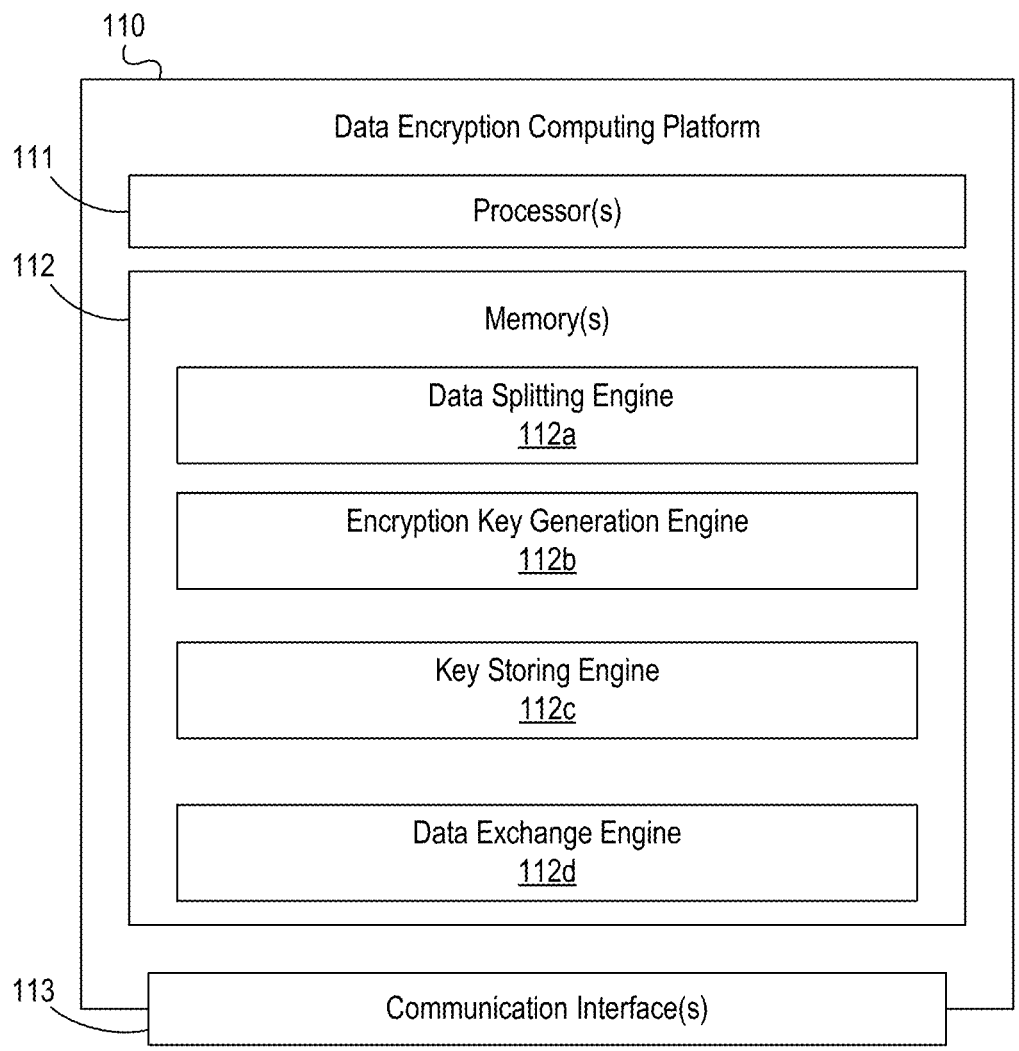

FIGS. 1A and 1B depict an illustrative computing environment for data transmission with encryption of protected data. Referring to FIG. 1A, computing environment 100 may include one or more computer systems. For example, computing environment 100 may include a data encryption computing platform 110, enterprise computing infrastructure 120, an enterprise data storage platform 130, and external vendor 140.

As illustrated in greater detail below, data encryption computing platform 110 may include one or more computing devices configured to perform one or more of the functions described herein. For example, data encryption computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more enterprise user devices 140. For example, enterprise computing infrastructure 120 may be configured to host, execute, and/or otherwise provide one or more applications, such as, for example, security applications, human resource applications, financial applications, and/or other applications associated with an enterprise server. In some instances, enterprise computing infrastructure 120 may be configured to provide various enterprise and/or back-office computing functions for an enterprise organization. For example, enterprise computing infrastructure 120 may include various functions that communicate with servers and/or databases that store and/or otherwise maintain customer information, such as personal information including name, address, telephone number, an electronic mail address, date of birth, social security number, and so forth. Additionally or alternatively, enterprise computing infrastructure 120 may receive instructions from data encryption computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. For example, enterprise data storage platform 130 may be configured to store and/or otherwise maintain, customer information, such as personal information including name, address, telephone number, an electronic mail address, date of birth, social security number, and so forth. Additionally or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

External vendor 140 may include one or more computing devices and/or other computer components (e.g., processors, memories, communication interfaces). In addition, enterprise computing infrastructure 120 may be configured to host, execute, interface with, and/or otherwise provide one or more data sources for customer information. In some embodiments, external vendor 140 may be a personal computing device (e.g., desktop computer, laptop computer) or mobile computing device (e.g., smartphone, tablet, wearable device), that may be a source of information. Generally, external vendor 140 may be a service provider that facilitates communication of enterprise data to third parties. In some embodiments, external vendor 140 may include marketing execution partners, direct marketing partners, third party digital platforms, such as social networking sites, and so forth.

Computing environment 100 also may include one or more networks, which may interconnect one or more of data encryption computing platform 110, enterprise computing infrastructure 120, enterprise data storage platform 130, and/or external vendor 140. For example, computing environment 100 may include a private network 150 (which may, e.g., interconnect data encryption computing platform 110, enterprise computing infrastructure 120, enterprise data storage platform 130, enterprise user device 140, and/or one or more other systems which may be associated with an organization, and public network 160 (which may, e.g., interconnect enterprise user device 140 with private network 150 and/or one or more other systems, public networks, sub-networks, and/or the like). Public network 160 may be a cellular network, including a high generation cellular network, such as, for example, a 5G or higher cellular network. In some embodiments, private network 150 may likewise be a high generation cellular enterprise network, such as, for example, a 5G or higher cellular network. In some embodiments, computing environment 100 also may include a local network (which may, e.g., interconnect enterprise user device 140 and one or more other devices with each other).

In one or more arrangements, enterprise computing infrastructure 120, enterprise data storage platform 130, and/or external vendor 140, and/or the other systems included in computing environment 100 may be any type of computing device capable of receiving input via a user interface, and communicating the received input to one or more other computing devices. For example, enterprise computing infrastructure 120, enterprise data storage platform 130, and/or external vendor 140, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of data encryption computing platform 110, enterprise computing infrastructure 120, enterprise data storage platform 130, and/or external vendor 140, may, in some instances, be special-purpose computing devices configured to perform specific functions.

Referring to FIG. 1B, data encryption computing platform 110 may include one or more processors 111, memory 112, and communication interface 113. A data bus may interconnect processor 111, memory 112, and communication interface 113. Communication interface 113 may be a network interface configured to support communication between data encryption computing platform 110 and one or more networks (e.g., network 160, network 170, a local network, or the like). Memory 112 may include one or more program modules having instructions that when executed by processor 111 cause data encryption computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of data encryption computing platform 110 and/or by different computing devices that may form and/or otherwise make up data encryption computing platform 110. For example, memory 112 may have, store, and/or include a data splitting engine 112a, an encryption key generation engine 112b, a key storing engine 112c, and a data exchange engine 112d. Data splitting engine 112a may have instructions that direct and/or cause data encryption computing platform 110 to separate, via a computing device and in electronic data associated with a user, protected data from non-protected attribute data. Encryption key generation engine 112b may have instructions that direct and/or cause data encryption computing platform 110 to generate, for the protected data, an encryption key. In some embodiments, encryption key generation engine 112b may have instructions that direct and/or cause data encryption computing platform 110 to modify the electronic data by replacing the protected data with the encryption key. Key storing engine 112c may have instructions that direct and/or cause data encryption computing platform 110 to store, in a database, an association between the user, the protected data, and the encryption key. Data exchange engine 112d may have instructions that direct and/or cause data encryption computing platform 110 to provide, via a network and to an external vendor, the modified electronic data comprising the encryption key and the non-protected attribute data.

Figure 2:
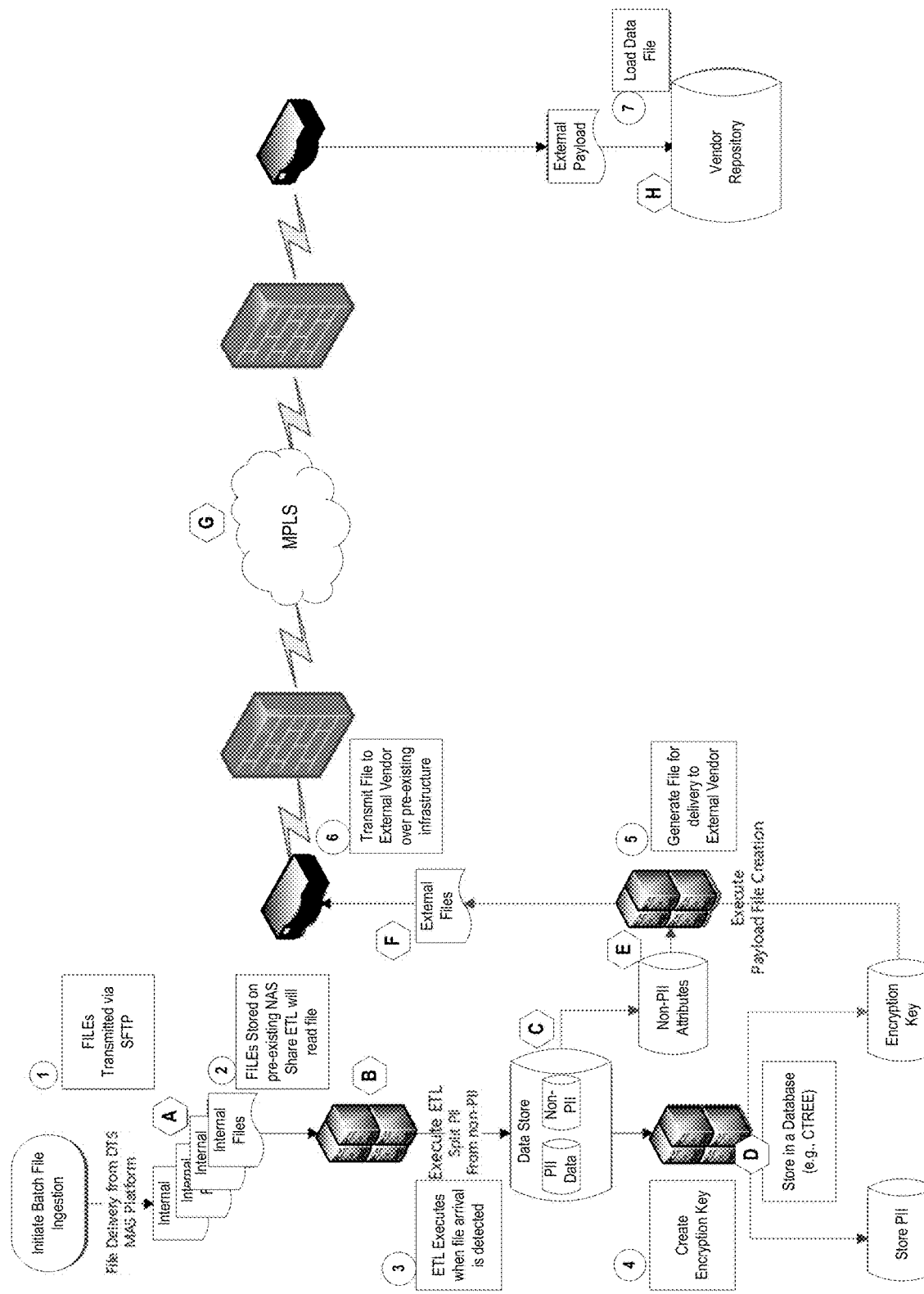
FIG. 2 depicts an illustrative event sequence for data transmission with encryption of protected data.

FIG. 2 depicts an illustrative event sequence for data transmission with encryption of protected data. Generally, an enterprise organization may process a various types of data, and there may be an external vendor, such as a data management vendor, that may facilitate management, transmission, storage, and/or update of such data. Data may include, for example, data associated with demographic information, market segment information (e.g., residential information, lifestyle, date of birth, and so forth). In some instances, certain types of data may be protected data. For example, there are more than thirty (30) known types of protected data. These may include protected personal information (e.g., personally identifiable information ("PII")), protected health information ("PHI"), personal credit information protected under the payment card industry data security standard ("PCI"). For example, PII generally refers to any data that may be potentially utilized to identify a particular person. Such data, may include, for example, a full name, a social security number, a driver's license number, a passport number, a bank account number, an electronic mail address, and so forth. PHI may be any health information that may be associated with a name, a geographical identifier, a phone number, a fax number, a social security number, a health record number, and so forth. Also, for example, PCI data may be any form of cardholder data, for example, associated with a credit card and/or a debit card.

In some embodiments, the process may begin by initiating a batch file for transfer to the external vendor. Generally, such files may include protected data and non-protected attribute data. Attribute data may be, for example, meta-data about a customer that is not protected data. For example, for marketing purposes, attribute data may be related to demographic information or market segmentation information (e.g. life style, etc.). The term "external" as used herein, generally refers to an entity external to an enterprise organization, that may have access to data from the enterprise organization. As the external vendor may sore and/or process the data, it may be of high significance for the enterprise organization to keep protected data and transmit files with non-protected attribute data. Accordingly, as described herein, data encryption computing platform 110 may separate, via a computing device and in electronic data associated with a user, protected data from non-protected attribute data.

In some embodiments, electronic data associated with the user may be in a data file, and the protected data may be an entry in a data field in the data file. Accordingly, data encryption computing platform 110 may identify contents of data fields that may be known to include protected data. For example, a data field for a name may include the name of the user. As another example, a data field for a date of birth may include the date of birth of the user.

In some embodiments, at step 1, files may be transmitted via a secure file transfer protocol ("SFTP"). Generally, the files may be sent in batches, where batch size may depend on a type of web interface available. In some embodiments, a batch may include 50 records, where each record may be associated with a user.

In some embodiments, at step 2, data encryption computing platform 110 may retrieve and/or store internal files A in a network attached storage ("NAS") device B. In some embodiments, an extract, transform, load ("ETL") process may be performed to read the files. At step 3, upon detection of a file in the NAS device, the ETL process may be executed on the detected file to separate the protected data and the non-protected attribute data. The separated data may be stored in a data store C.

In some embodiments, at step 4, data encryption computing platform 110 may generate, for the protected data, an encryption key. For example, the encryption key may be generated by applying a hashing algorithm. In some embodiments, the encryption key may be based on a unidirectional hashing algorithm. For example, a "One Way Hash" may be utilized to generate the encryption key. Such a hash string or key may not be reverse engineered to recover the key and recover the protected data. For example, device D may generate the encryption key. Generally, data may be encrypted in transit, for example, by virtue of the secure sockets layer ("SSL") protocol utilized to transmit the files. Also, for example, protected data may be encrypted at rest, at device D, by virtue of a file storage infrastructure, such as for example, a decision tree based database (e.g., a CTREE database).

In some embodiments, data encryption computing platform 110 may store, in a database, an association between the user, the protected data, and the encryption key. For example, data encryption computing platform 110 may store the association in the CTREE database. For example, for data associated with a user in a file, and for a protected data associated with the user, data encryption computing platform 110 may store an association between the user, the protected data, and the encryption key for the protected data. For example, if an encryption key, <Key A>, is associated with protected data such as a name, <Name A>, of a user, <User A>, then data encryption computing platform 110 may store such data, and an association, in a CTREE database. Generally, as electronic data is uploaded via the NAS device, and ETL is performed, separation of the protected data from the non-protected attribute data, generating the encryption key for the protected data, and storing the protected data and the encryption key in the database, retrieval of data from the database, and so forth, may be performed in real-time.

In some embodiments, data encryption computing platform 110 may store an association between the user, the protected data, and the encryption key for the protected data, and the non-protected attribute data in the file. For example, if an encryption key, <Key A>, is associated with protected data such as a name, <Name A>, of a user, <User A>, and the non-protected attribute data includes demographic data, <Attribute1>, then data encryption computing platform 110 may store such data, and an association, in a CTREE database.

In some embodiments, data encryption computing platform 110 may modify the electronic data by replacing the protected data with the encryption key. For example, if an encryption key, <Key A>, is associated with protected data such as a name, <Name A>, of a user, <User A>, then data encryption computing platform 110 may replace <Name A> in the file with <Key A>. Also, for example, data encryption computing platform 110 may provide the non-protected attribute data, such as, non-PII attributes E, and execute payload file creation. In some embodiments, the non-PII attributes E may be stored in a meta-data store, and may be separate from the CTREE database that stores the encryption key. At step 5, data encryption computing platform 110 may generate the modified electronic data by merging the non-protected attribute data and the encryption key associated with the protected data. For example, if the data file has entries such as "Name: <Name A>; Non-PII Attribute: <Attribute1>;" then data encryption computing platform 110 may generate the modified electronic data as "Name: <Key A>; Non-PII Attribute: <Attribute1>."

In some embodiments, data encryption computing platform 110 may provide, via a network and to an external vendor, the modified electronic data comprising the encryption key and the non-protected attribute data. For example, at step 6, an external file F comprising the modified electronic data may be provided to the external vendor via pre-existing infrastructure. In some embodiments, a multi-protocol label switching ("MPLS") protocol G may be utilized. Upon receipt of the external files F, the external vendor, may at step 7, load the files onto a vendor repository H.

Figure 3:
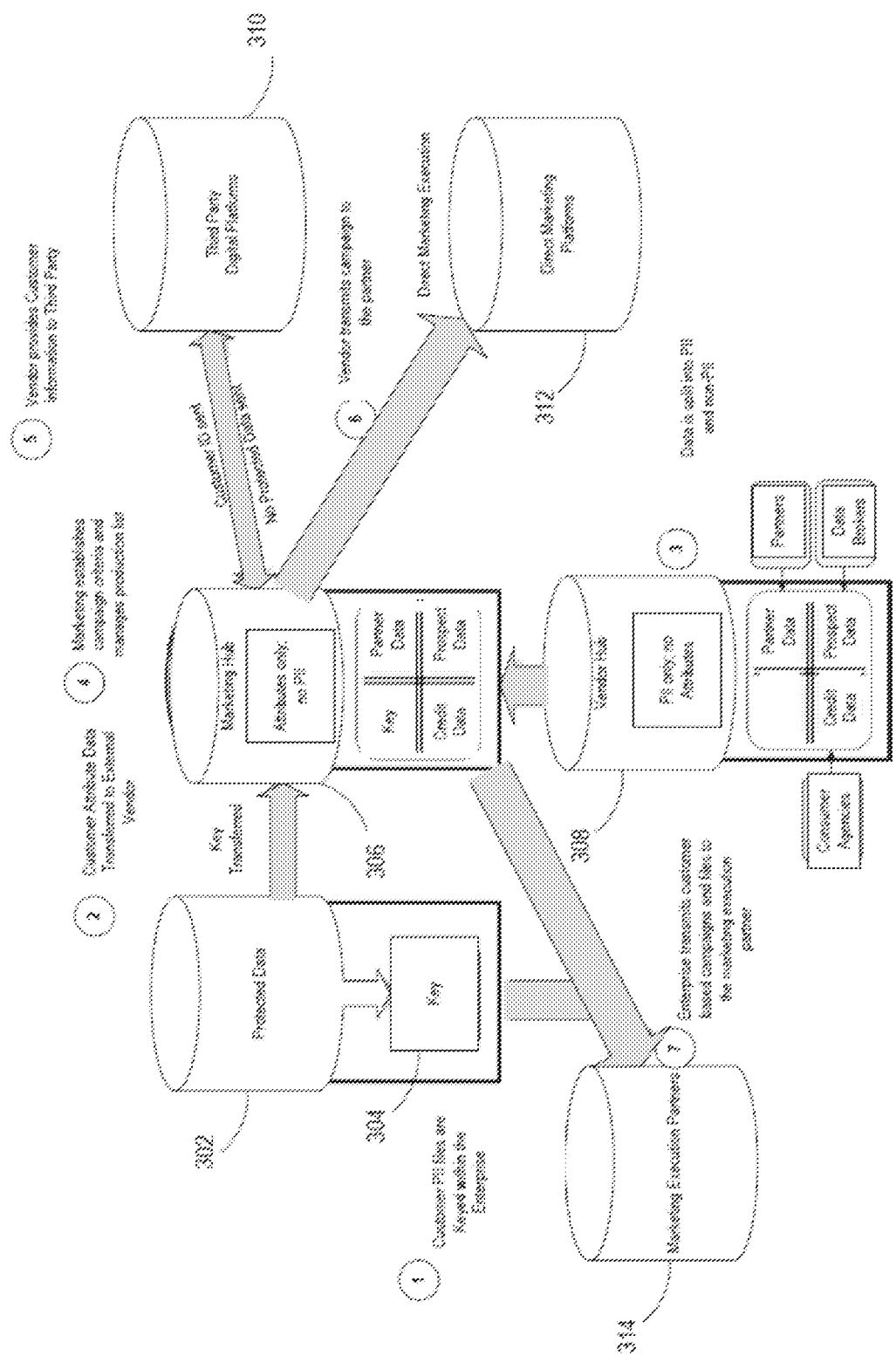
FIG. 3 depicts an illustrative flow in a computing environment for data transmission with encryption of protected data.

FIG. 3 depicts an illustrative flow in a computing environment for data transmission with encryption of protected data. In some embodiments, at step 1, an encryption key 304 may be generated from protected data 302. At step 2, non-protected attribute data may be transferred to a marketing hub or platform 306. For example, the file transferred to the external vendor may not include protected data, and may include non-protected attribute data. In some embodiments, as indicated with reference to vendor hub 308 may receive partner data from partners, prospect data from data brokers, and credit rating data from consumer protection agencies.

In some embodiments, vendor hub 308 may, at step 3, separate protected data from non-protected attribute data. Then, vendor hub 308 may provide, to marketing hub 306, a first file including protected data, but no non-protected attribute data. Marketing hub 306 may include a second file with non-protected attribute data, but no protected data. Accordingly, marketing hub 306 may replace the protected data in the first file with the corresponding encryption key 304.

In some embodiments, at step 4, marketing hub 306 may determine campaign criteria and manage production lists. The trend in marketing continues to be to tailor the message to the individual, and customize the message for the individual. Social media may include shared information that enables advertisers to tailor their content to specific customer segments. By having an ability to separate the non-protected data from other pieces of information known about customers (e.g., gathered at various third parties at a very high transaction rate), data encryption computing platform 110 may facilitate an ability to "personalize at scale."

Accordingly, a modified file may be generated that includes the encryption key (corresponding to the protected data from the first file), and the non-protected attribute data from the second file. In some embodiments, at step 5, the modified file may be provided to third-party platforms 310. In some embodiments, at step 6, the campaign criteria may be provided to direct marketing platforms 312. Also, for example, marketing hub 306 may retrieve non-protected attribute data from third-party platforms 310. In some embodiments, at step 7, marketing hub 306 may provide the modified file to marketing execution partners 314.

The computing environment described in FIG. 3 has several advantages. As indicated, role segregation may be achieved, with restricted access to a single environment, such as marketing hub 306 where no protected data is available, and vendor hub 308 where no non-protected attribute data is available. Accordingly, upon a potential breach of the marketing hub 306, no PII may be available. Also, for example, the encryption key may not be reverse engineered to recover the protected data. As another example, upon a potential breach of the vendor hub 308, no non-protected attribute data may be available. As another example, during data transmission, protected data is not transmitted, and the encryption key is non-reversible. Additionally, data integrity is protected as the association between the user, the protected data, the encryption key, and the non-protected attribute data is maintained during the process. Additional security may comprise disabling copy and/or paste operations between marketing hub 306 and vendor hub 308.

Figure 4:
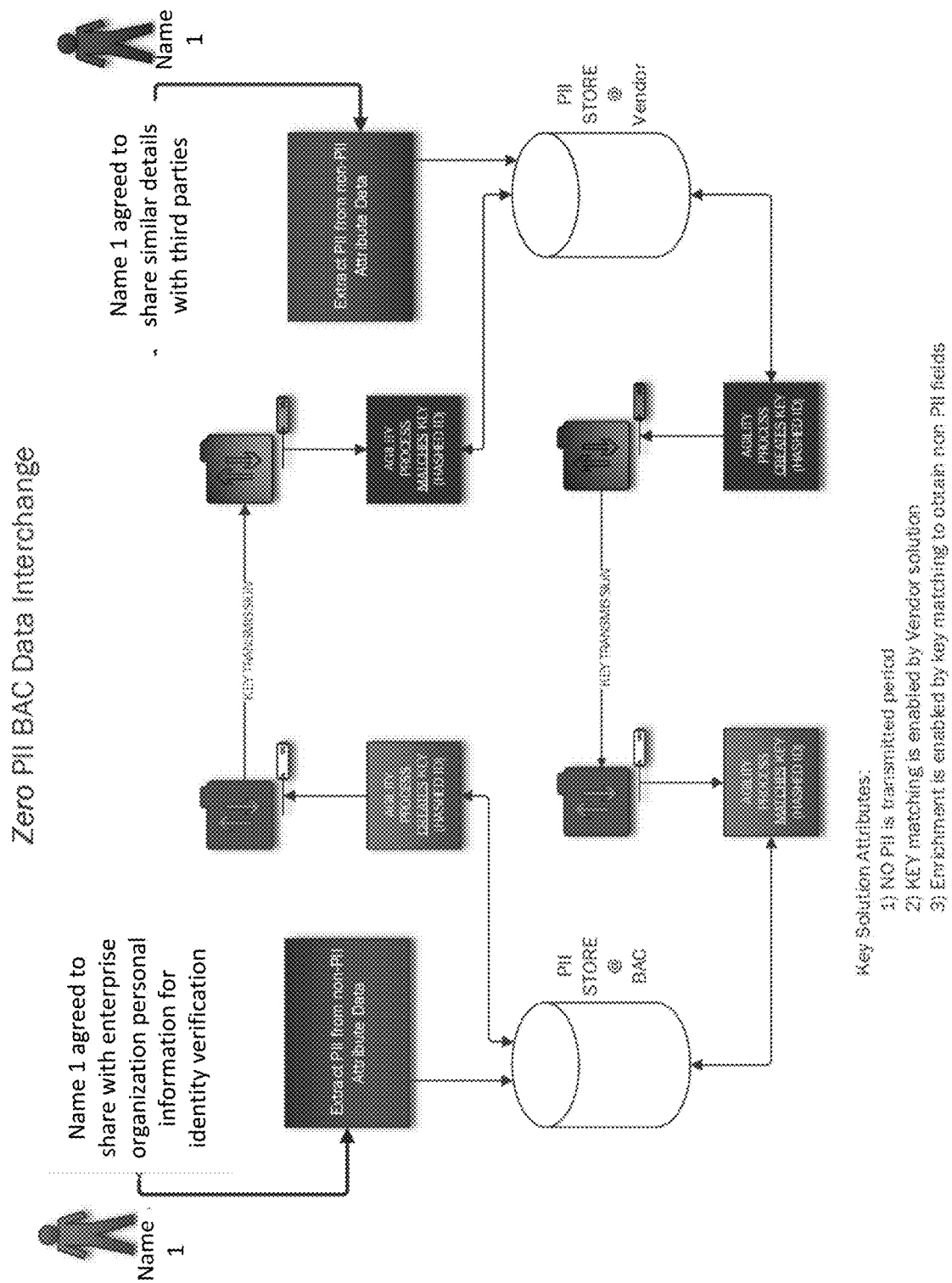
FIG. 4 depicts an illustrative data interchange process for data transmission with encryption of protected data.

FIG. 4 depicts an illustrative data interchange process for data transmission with encryption of protected data. For example, user 402, Name 1, may share information with an enterprise organization. For example, user 402 may share personal information, such as a name, date of birth, social security number, and so forth, with the enterprise organization. In some embodiments, as described herein, at 404, data encryption computing platform 110 may separate protected data from non-protected attribute data. In some embodiments, at 420, data encryption computing platform 110 may store the protected data in a data store. At 408, data encryption computing platform 110 may generate an encryption key for the protected data. At 410, the encryption key may be transmitted to an external vendor.

In some embodiments, user 414, or Name 1, may share information with the external vendor and/or third-parties. In some embodiments, the information may include, for example, a name, an address, a telephone number, an electronic mail address, and so forth. In some embodiments, the external vendor processes may mirror those of the enterprise organization. For example, at 416, the protected data may be separated from non-protected attribute data. In some embodiments, at 418, the protected data may be stored in a data store.

Upon the transmission of the encryption key at 410, vendor platform may match, at 412, the encryption key with the encryption keys stored in the data store at 418. Accordingly, based on a match, vendor platform may determine that user 402 is identical to user 414. In some embodiments, the protected data and the non-protected attribute data associated with user 402 and user 414 may be combined to generate a larger dataset associated with Name 1.

In some embodiments, vendor platform may, at 422, generate an encryption key for the protected data, and at 426, may transmit the encryption key to the enterprise platform. Accordingly, data encryption computing platform 110 may match, at 424, the encryption key received from the vendor platform, with encryption keys stored in the data store at 420. Accordingly, based on a match, data encryption computing platform 110 may determine that user 402 is identical to user 414. In some embodiments, data encryption computing platform 110 may combine the protected data and the non-protected attribute data associated with user 402 and user 414 to generate a larger dataset associated with Name 1.

In some embodiments, data encryption computing platform 110 may receive at 426, from the external vendor, a second encryption key associated with a second protected data. For example, the second encryption key may be associated with a second protected data, such as a name. Then, data encryption computing platform 110 may compare, at 424, the second encryption key with the encryption key stored in the data store at 420. Upon a determination that the second encryption key is identical to the encryption key, data encryption computing platform 110 may determine that the second protected data is identical to the protected data. For example, data encryption computing platform 110 may determine that the two names match, and accordingly, that user 402 is identical to user 414.

Generally, generation of an encryption key and lookup of the protected data associated with the encryption key, may be an on-demand service. Accordingly, such a service may rely on a web service. A web services may be an asynchronous request response call to a web host over a secure protocol, such as, for example, an https protocol. Such web service calls may generally require sub-second response times to the request. In some embodiments, a payload may be provided, and a response to the payload may be generated as a result. Generally, the payload may include encrypted data and non-protected attribute data. In some embodiments, a third-party vendor may have to display user information.

For example, during a transaction, the third-party vendor may have to display, in an interactive session via a web portal, the user information. Accordingly, upon a determination that a second user (e.g., the user participating in the interactive session via the web portal) is authorized to access the protected data, data encryption computing platform 110 may retrieve, from the database, the association between the user, the protected data, and the encryption key. Then, data encryption computing platform 110 may replace the encryption key with the plaintext of the protected data. Subsequently, data encryption computing platform 110 may provide the plaintext of the protected data to the second user, for example, in the interactive session via the web portal. Accordingly, by a simplified exchange of encryption keys, PII information may be exchanged in a real-time session.

In some embodiments, data encryption computing platform 110 may receive, from the external vendor, a first encryption key and a second encryption key. For example, the first encryption key may correspond to a name, and the second encryption key may correspond to a telephone number of a user. Then, data encryption computing platform 110 may retrieve, from the database, the association between the user, the protected data, and the encryption key. In some embodiments, data encryption computing platform 110 may determine, based on a comparison of the first encryption key and the encryption key, that the first encryption key is identical to the encryption key. Accordingly, data encryption computing platform 110 may associate the user with second protected data associated with the second encryption key. For example, user 402 may have been associated with a name (corresponding to the first encryption key). However, after the comparison is performed, data encryption computing platform 110 may determine that user 402 is identical to user 414. Accordingly, second protected data, such as a telephone number, that may have been previously missing in the enterprise organization's database, may now be added to information associated with user 402. In many instances, a vendor platform may retrieve information associated with an individual from a variety of sources, such as, for example, partner data from partners, prospect data from data brokers, and/or credit rating data from credit bureaus.

Figure 5:
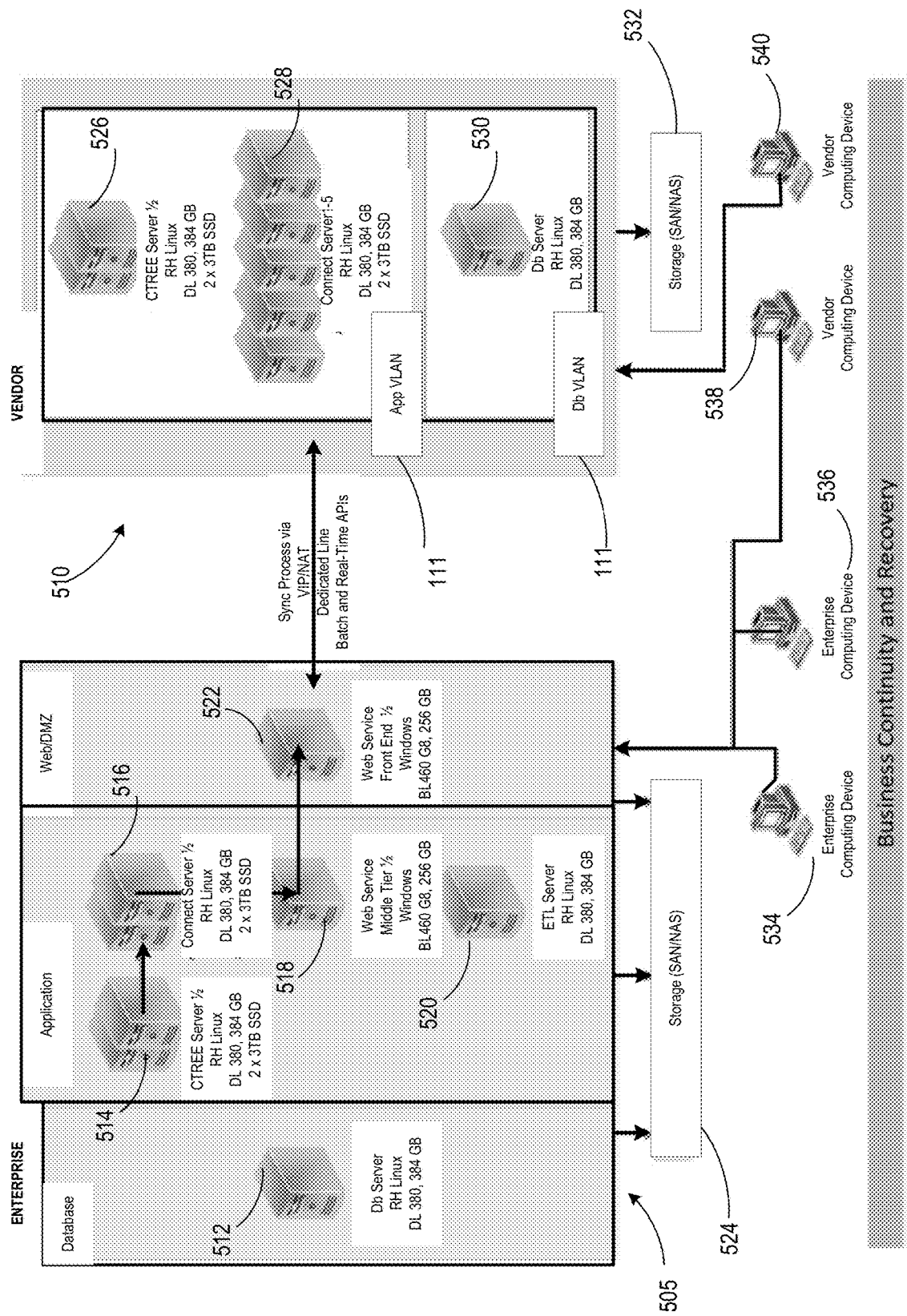
FIG. 5 depicts illustrative computing components for data transmission with encryption of protected data.

FIG. 5 depicts illustrative computing components for data transmission with encryption of protected data. For example, enterprise platform 505 may utilize, for database services, a first database server 512, as a metadata repository for the data services component (e.g., for non-protected attribute data), supporting RH Linux, and with a DL 380 configuration with 384 Giga Byte ("GB") capacity.

Also, for example, enterprise platform 505 may utilize, for application support, a second server 1/2 514 may be utilized for a CTREE database, where the second server is supported by RH Linux, and with a DL 380 configuration with 384 GB capacity, and a 2×3 Tera Byte solid state device ("SSD"). As another example, a third server 1/2 516 may be utilized for associating the encryption key and the protected data, where the third server is supported by RH Linux, and with a DL 380 configuration with 384 GB capacity, and a 2×3 Tera Byte solid state device ("SSD").

In some embodiments, a middle tier web service may be provided by a fourth server 1/2 518, and a final tier web service may be provided by a fifth server 1/2 522, both utilized for real-time web application programming interface ("API") calls, and configured with a WINDOWS system such as a BL 460 GB with a 256 GB capacity. In some embodiments, the final tier web service may be part of the Web/DMZ services.

In some instances, an ETL server 520 may be configured for pre- and post-encryption processing, and also for outbound processing of files. ETL server 520 may be supported by RH Linux, and with a DL 380 configuration with 384 GB capacity. Generally, as described herein, these servers may transmit, store, and/or exchange data via a NAS device 524. In some embodiments, enterprise platform 505 may be communicatively linked to one or more computing devices, such as, for example, a first enterprise computing device 534, a second enterprise computing device 536, and a vendor computing device 538.

On the vendor platform 510, some of these capabilities may be duplicated. For example, for Application VLAN, vendor platform 510 may utilize a CTREE database 526, supported by RH Linux, and with a DL 380 configuration with 384 GB capacity, and a 2×3 Tera Byte solid state device ("SSD"). Also, for example, for Database VLAN, vendor platform 510 may utilize a database server 530, supported by RH Linux, and with a DL 380 configuration with 384 GB capacity. Generally, as described herein, these servers may transmit, store, and/or exchange data via a NAS device 532. In some embodiments, vendor platform 510 may be communicatively linked to a vendor computing device 540.

Figure 6:
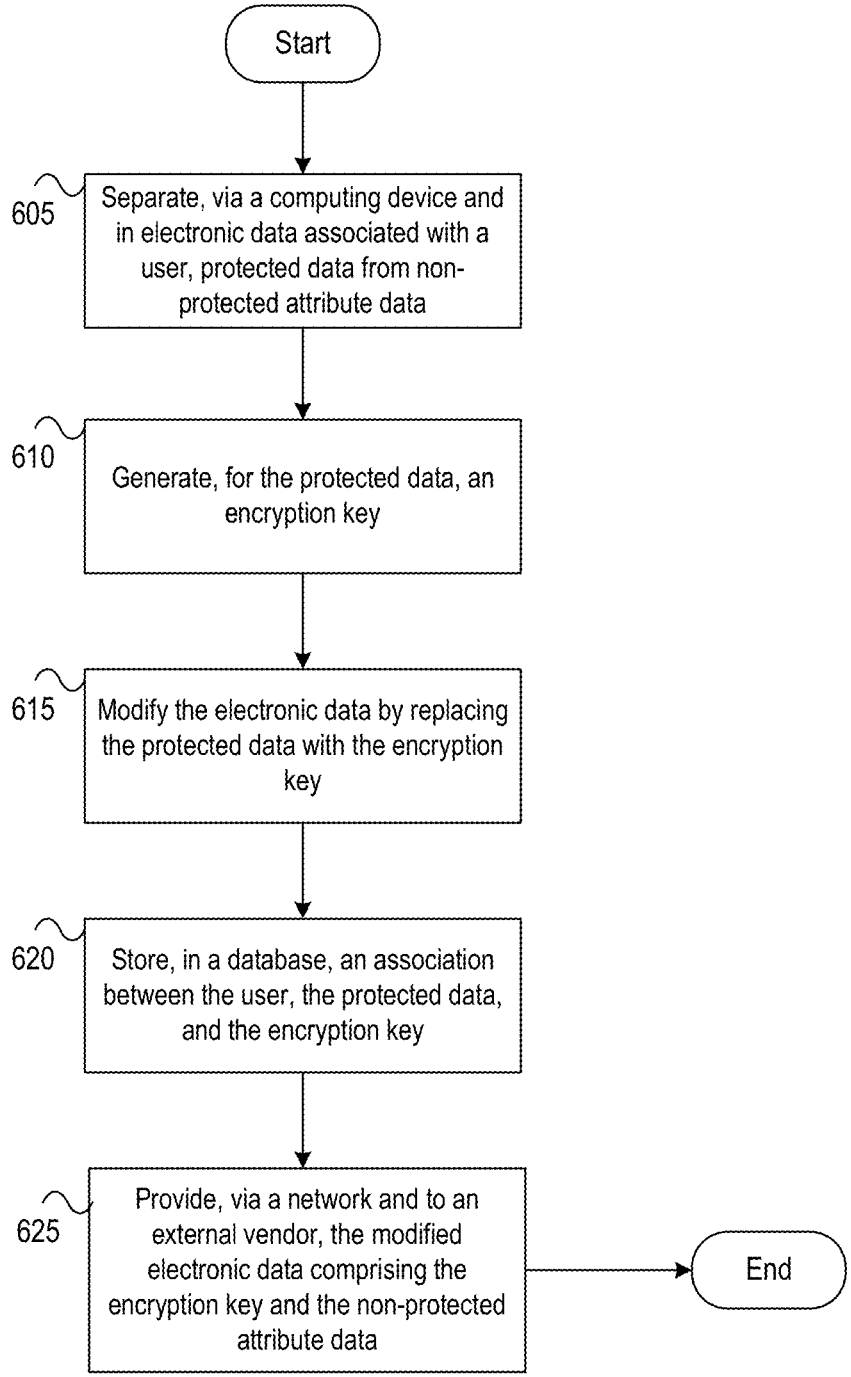
FIG. 6 depicts an illustrative method for data transmission with encryption of protected data.

FIG. 6 depicts an illustrative method for data transmission with encryption of protected data. Referring to FIG. 6, at step 605, a computing platform having at least one processor, a communication interface, and memory may separate, via a computing device and in electronic data associated with a user, protected data from non-protected attribute data. At step 610, data encryption computing platform 110 may generate, for the protected data, an encryption key. At step 615, data encryption computing platform 110 may modify the electronic data by replacing the protected data with the encryption key. At step 620, data encryption computing platform 110 may store, in a database, an association between the user, the protected data, and the encryption key. At step 625, data encryption computing platform 110 may provide, via a network and to an external vendor, the modified electronic data comprising the encryption key and the non-protected attribute data.

Figure 7:
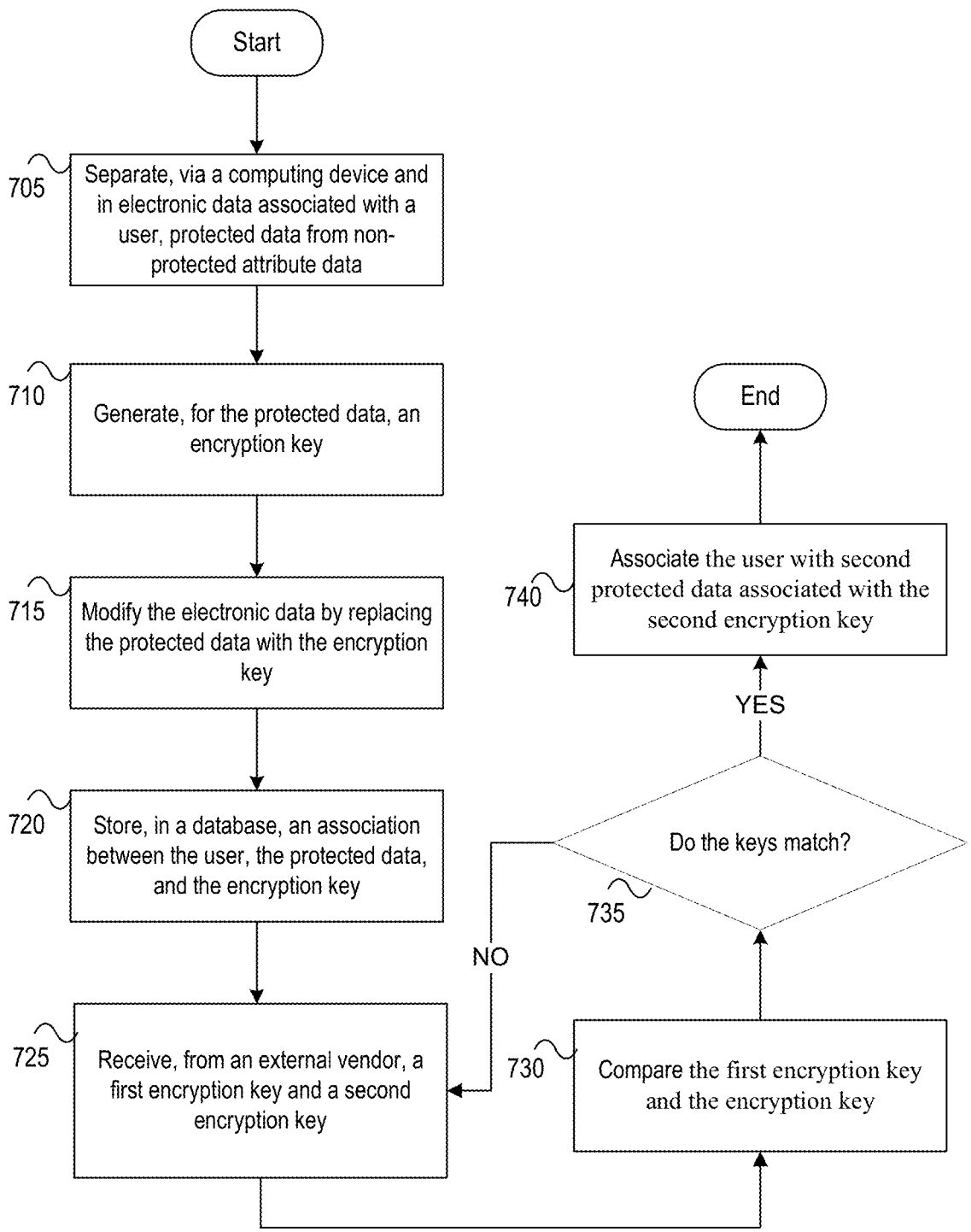
FIG. 7 depicts another illustrative method for data transmission with encryption of protected data.

FIG. 7 depicts an illustrative method for data transmission with encryption of protected data. Referring to FIG. 7, at step 705, a computing platform having at least one processor, a communication interface, and memory may separate, via a computing device and in electronic data associated with a user, protected data from non-protected attribute data. At step 710, data encryption computing platform 110 may generate, for the protected data, an encryption key. At step 715, data encryption computing platform 110 may modify the electronic data by replacing the protected data with the encryption key. At step 720, data encryption computing platform 110 may store, in a database, an association between the user, the protected data, and the encryption key. At step 725, data encryption computing platform 110 may receive, from an external vendor, a first encryption key and a second encryption key. At step 730, data encryption computing platform 110 may compare the first encryption key and the second encryption key. At step 735, data encryption computing platform 110 may determine whether the first encryption key matches the second encryption key. Upon a determination that the first encryption key does not match the second encryption key, data encryption computing platform 110 may return to step 725 to receive additional encryption keys from the external vendor. Upon a determination that the first encryption key matches the second encryption key, data encryption computing platform 110 may proceed to step 740. At step 740, data encryption computing platform 110 may associate, based on the determination that the first encryption key is identical to the encryption key, the user with second protected data associated with the second encryption key.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor; and
   memory storing computer-readable instructions that, when executed by the at least one processor, cause the computing platform to:
   detect a data file in a network attached storage device, the data file including electronic data associated with a user;

responsive to detecting the data file in the network attached storage device, execute an extract, transform, load process to separate, in the data file including the electronic data associated with the user, protected data from non-protected attribute data, wherein the protected data is an entry in a data field in the data file;

generate, for the protected data, an encryption key, wherein generating the encryption key is based on a unidirectional hashing algorithm;

modify the electronic data by replacing the protected data with the encryption key;

store, in a database, an association between the user, the protected data, and the encryption key;

generate a modified electronic file merging the non-protected attribute data and the encryption key; and provide, via a network and to an external vendor, the modified electronic file comprising the merged encryption key and the non-protected attribute data.

2. The computing platform of claim 1, wherein the instructions comprise additional computer-readable instructions that, when executed by the at least one processor, cause the computing platform to:

upon a determination that a second user is authorized to access the protected data, retrieve, from the database, the association between the user, the protected data, and the encryption key;

replace, in real-time and based on the retrieved association and in the modified electronic data, the encryption key with plaintext of the protected data; and provide the plaintext of the protected data to the second user.

3. The computing platform of claim 1, wherein the instructions comprise additional computer-readable instructions that, when executed by the at least one processor, cause the computing platform to:

retrieve, via the network, the electronic data from the network attached storage device.

4. The computing platform of claim 1, wherein the instructions comprise additional computer-readable instructions that, when executed by the at least one processor, cause the computing platform to:

receive, from the external vendor, a second encryption key associated with a second protected data;

compare the second encryption key with the encryption key; and upon a determination that the second encryption key is identical to the encryption key, determine that the second protected data is identical to the protected data.

5. The computing platform of claim 1, wherein the instructions comprise additional computer-readable instructions that, when executed by the at least one processor, cause the computing platform to:

receive, from the external vendor, a first encryption key and a second encryption key;

determine, based on a comparison of the first encryption key and the encryption key, that the first encryption key is identical to the encryption key; and associate, based on the determination that the first encryption key is identical to the encryption key, the user with second protected data associated with the second encryption key.

6. A method, comprising:

by a computing platform comprising at least one processor, and memory:

detecting a data file in a network attached storage device, the data file including electronic data associated with a user;

responsive to detecting the data file in the network attached storage device, execute an extract, transform, load process to separate, via a computing device and in the data file including the electronic data associated with the user, protected data from non-protected attribute data, wherein the protected data is an entry in a data field in the data file;

generating, for the protected data, an encryption key, wherein generating the encryption key is based on a unidirectional hashing algorithm;

modifying the electronic data by replacing the protected data with the encryption key;

storing, in a database, an association between the user, the protected data, and the encryption key;

generating a modified electronic file merging the non-protected attribute data and the encryption key; and providing, via a network and to an external vendor, the modified electronic file comprising the merged encryption key and the non-protected attribute data.

7. The method of claim 6, further comprising:

upon a determination that a second user is authorized to access the protected data, retrieving, from the database, the association between the user, the protected data, and the encryption key;

replacing, in real-time and based on the retrieved association and in the modified electronic data, the encryption key with plaintext of the protected data; and providing the plaintext of the protected data to the second user.

8. The method of claim 6, further comprising:

retrieving, via the network, the electronic data from the network attached storage device.

9. The method of claim 6, further comprising:

receiving, from the external vendor, a second encryption key associated with a second protected data;

comparing the second encryption key with the encryption key; and upon a determination that the second encryption key is identical to the encryption key, determining that the second protected data is identical to the protected data.

10. The method of claim 6, further comprising:

receiving, from the external vendor, a first encryption key and a second encryption key;

determining, based on a comparison of the first encryption key and the encryption key, that the first encryption key is identical to the encryption key; and associating, based on the determination that the first encryption key is identical to the encryption key, the user with second protected data associated with the second encryption key.

11. One or more non-transitory computer-readable media storing instructions that, when executed by a computing platform comprising at least one processor, and memory, cause the computing platform to:

detect a data file in a network attached storage device, the data file including electronic data associated with a user;

responsive to detecting the data file in the network attached storage device, execute an extract, transform, load process to separate, in the data file including the electronic data associated with the user, protected data from non-protected attribute data, wherein the protected data is an entry in a data field in the data file;

generate, for the protected data, an encryption key, wherein generating the encryption key is based on a unidirectional hashing algorithm;

modify the electronic data by replacing the protected data with the encryption key;

store, in a database, an association between the user, the protected data, and the encryption key;

generate a modified electronic file merging the non-protected attribute data and the encryption key; and provide, via a network and to an external vendor, the modified electronic file comprising the merged encryption key and the non-protected attribute data.

12. The one or more non-transitory computer-readable media of claim 11, wherein the instructions comprise additional instructions that when executed by the computing platform, cause the computing platform to:

upon a determination that a second user is authorized to access the protected data, retrieve, from the database, the association between the user, the protected data, and the encryption key;

replace, based on the retrieved association and in the modified electronic data, the encryption key with plaintext of the protected data; and provide the plaintext of the protected data to the second user.

13. The one or more non-transitory computer-readable media of claim 11, wherein the instructions comprise additional instructions that when executed by the computing platform, cause the computing platform to:

receive, from the external vendor, a second encryption key associated with a second protected data;

compare the second encryption key with the encryption key; and upon a determination that the second encryption key is identical to the encryption key, determine that the second protected data is identical to the protected data.

14. The one or more non-transitory computer-readable media of claim 11, wherein the instructions comprise additional instructions that when executed by the computing platform, cause the computing platform to:

receive, from the external vendor, a first encryption key and a second encryption key;

determine, based on a comparison of the first encryption key and the encryption key, that the first encryption key is identical to the encryption key; and associate, based on the determination that the first encryption key is identical to the encryption key, the user with second protected data associated with the second encryption key.

* * * * *